(12) United States Patent
Bagüés

(10) Patent No.: US 7,614,881 B2
(45) Date of Patent: Nov. 10, 2009

(54) ARITHMETIC BLOCK

(76) Inventor: Diane Madeline Bagüés, 2013 SE. Waldron Rd., Milwaukie, OR (US) 97222

( * ) Notice: Subject to any disclaimer, the term of this patent is extended or adjusted under 35 U.S.C. 154(b) by 461 days.

(21) Appl. No.: 11/482,221

(22) Filed: Jul. 7, 2006

(65) Prior Publication Data

US 2007/0009867 A1    Jan. 11, 2007

Related U.S. Application Data

(60) Provisional application No. 60/697,794, filed on Jul. 8, 2005.

(51) Int. Cl.
*G09B 19/02* (2006.01)

(52) U.S. Cl. ........................ 434/188; 434/403

(58) Field of Classification Search ............ 434/171, 434/172, 188, 191, 205, 208, 209, 211, 403
See application file for complete search history.

(56) References Cited

U.S. PATENT DOCUMENTS

| | | | |
|---|---|---|---|
| 2,513,596 A | 7/1950 | Severson et al. ............... 35/70 |
| 2,839,844 A * | 6/1958 | Lehnkering ................. 434/207 |
| 3,504,449 A | 4/1970 | Kobler et al. .................. 35/31 |
| 3,696,533 A | 10/1972 | Mortensen ..................... 35/70 |
| 3,999,310 A | 12/1976 | Lufkin et al. .................. 35/31 |
| 4,212,118 A | 7/1980 | Baldwin et al. ............. 35/31 C |
| 4,360,347 A | 11/1982 | Ghaznavi ..................... 434/198 |
| 4,466,799 A | 8/1984 | Argiro ......................... 434/203 |
| 4,518,359 A * | 5/1985 | Yao-Psong .................. 434/195 |
| 4,838,794 A * | 6/1989 | Coddington ................ 434/187 |
| 4,846,687 A * | 7/1989 | White et al. ................. 434/112 |
| 5,098,301 A | 3/1992 | Woods ........................ 434/195 |
| 5,156,548 A * | 10/1992 | Grafflage .................... 434/208 |
| 5,176,381 A * | 1/1993 | Winters ....................... 273/146 |
| 5,275,567 A * | 1/1994 | Whitfield .................... 434/113 |
| 5,338,203 A * | 8/1994 | Rheams ....................... 434/208 |
| 5,653,594 A | 8/1997 | Lai ............................. 434/209 |
| 5,833,465 A | 11/1998 | Jarzewiak ................... 434/171 |
| 6,271,453 B1 * | 8/2001 | Hacker ......................... 84/476 |
| 7,011,525 B2 * | 3/2006 | Mejia .......................... 434/167 |
| 7,137,819 B2 * | 11/2006 | Bagues ........................ 434/188 |

* cited by examiner

*Primary Examiner*—Kurt Fernstrom
(74) *Attorney, Agent, or Firm*—Kunzler & McKenzie

(57) ABSTRACT

An apparatus and system are disclosed for teaching mathematical concepts and "fact families." The apparatus comprises an educational toy block configured, in one embodiment, to help young children memorize basic numbers and number facts in an atmosphere focused solely on play. The toy block, in one embodiment, comprises a polygonal-shaped building block having a plurality of faces, wherein a first face features a first mathematical equation and a second face features a second mathematical equation. The toy block may include a display of multiple mathematical equations in order to facilitate teaching children how mathematical operations are related. In a further embodiment, the toy block displays one or more numbers that are numerical elements in a plurality of mathematical equations forming a "fact family."

20 Claims, 5 Drawing Sheets

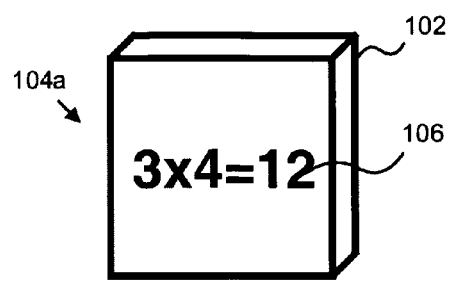
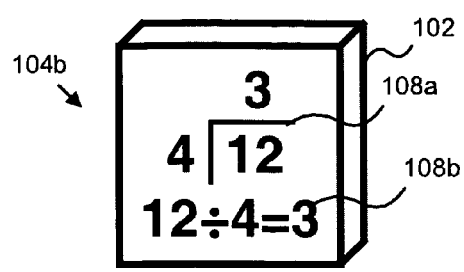
FIG. 3    FIG. 4
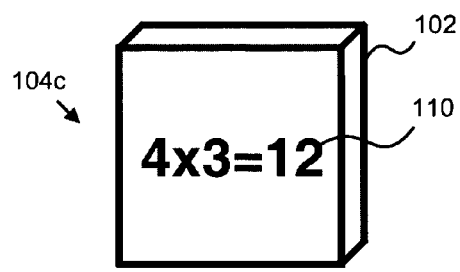
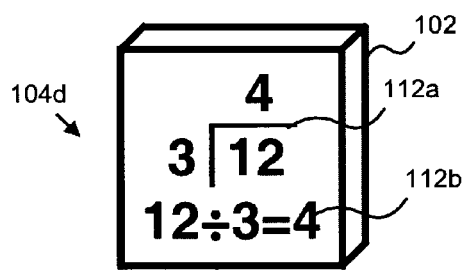
FIG. 5    FIG. 6
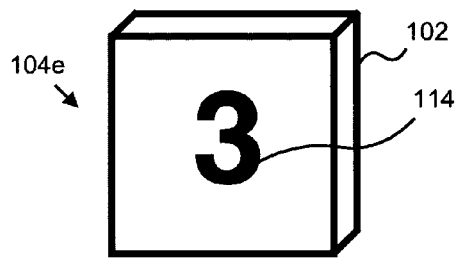
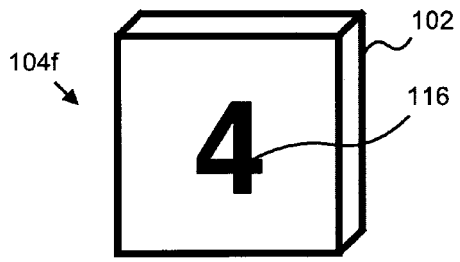
FIG. 7    FIG. 8

ARITHMETIC BLOCK

CROSS-REFERENCES TO RELATED APPLICATIONS

This application claims priority to U.S. Provisional Patent Application No. 60/697,794 entitled "Arithmetic Block" and filed on Jul. 8, 2005 for Diane Madeline Bagüés, which is incorporated herein by reference.

BACKGROUND OF THE INVENTION

1. Field of the Invention

This invention relates to educational toys and more particularly relates to building blocks for teaching mathematical concepts.

2. Description of the Related Art

More and more is being asked of children academically at an increasingly younger age. Numerous devices of varying complexity are currently available to facilitate teaching basic arithmetic concepts and mathematical facts to young children. Yet ultimately what is required of children is, first, memorization of numbers and mathematical equations, including multiplication tables, and second, a basic recognition of how numbers and mathematical operations are related, including inverse relationships.

When teaching inverse operations, such as addition and subtraction and multiplication and division, basic number facts are commonly illustrated using three numbers in a simple equation. Groups of equations using the same three numbers are often referred to as "fact families." Teaching or illustrating "fact families" helps children recognize the value of a number relative to other numbers. In addition, teaching "fact families" allows children to learn the relationship of mathematical operations, particularly when the sequence of the numbers or the order of the operation is reversed.

Devices such as flash cards to practice and test the learning of number facts are well known. Other devices require the child to match numbers and objects or to assemble numbers and arithmetic operands in a correct sequence, such as blocks that each contain a single number or operand from which can be constructed a mathematical equation. Some devices include intricate mechanisms to ensure that the sequence is ordered correctly. Electronic devices and computer programs are also known devices used to teach number facts to children.

While the known prior art devices accomplish their goals to varying degrees, all require the child to focus on mastering the given task, which may be appropriate for older or more academically advanced children. None of the devices, however, focuses on providing a child simple familiarity with numbers and equations while engaged in play, in particular while playing with a variation of the traditional alphabet/numbers blocks.

From the foregoing discussion, it should be apparent that a need exists for an apparatus and system for an educational toy block that facilitates teaching young children a basic level of familiarity with numbers and mathematical operations. Beneficially, such an apparatus and system would enable the child to comprehend and memorize basic mathematical operations at an accelerated level. In addition, the apparatus and system would provide additional developmentally appropriate learning mechanisms, including a building block for playing.

SUMMARY OF THE INVENTION

The present invention has been developed in response to the present state of the art, and in particular, in response to the problems and needs in the art that have not yet been fully solved by currently available educational toys and building blocks. Accordingly, the present invention has been developed to provide an apparatus and system for teaching mathematical operations and "fact families" that overcome many or all of the above-discussed shortcomings in the art.

The apparatus comprises an educational toy block configured, in one embodiment, to help young children memorize basic numbers and number facts in an atmosphere focused solely on play. The toy block may include a display of multiple mathematical equations in order to facilitate teaching children how mathematical operations are related. In a further embodiment, the toy block displays one or more numbers that are numerical elements in a plurality of mathematical equations forming a "fact family."

The toy block, in one embodiment, comprises a polygonal-shaped building block having a plurality of faces, wherein a first face features a first mathematical equation and a second face features a second mathematical equation. In certain embodiments, the polygonal-shaped building block comprises a cube. In one embodiment, the second mathematical equation comprises the inverse operation of the first mathematical equation. A third face of the building block may feature a third equation wherein the sequence of the numerical elements of the first mathematical equation is reversed. In addition, a fourth face of the building block may feature a fourth equation that comprises the inverse operation of the third equation. A fifth face of the toy block may feature a first number, and a sixth face may feature a second number, wherein the mathematical equations include the featured first and second numbers.

The invention may further facilitate tactile learning and visual recognition. In one embodiment, the arithmetic block provides a mathematics learning tool for those who are blind or visually impaired. The numbers and/or elements of the mathematical equations may be raised relative to the surface of the building block in certain embodiments. In a further embodiment, the raised features are distinctively colored. In addition, the toy block may include a Braille transliteration of the featured numbers and/or mathematical equations. Thus, children both with or without disabilities may enjoy and learn mathematical principles from the toy block as well as muscle coordination and tactile sensitivity.

A system of the present invention is also presented for familiarizing children with multiple numbers and mathematical operations for "fact families." The system may be embodied in a set of educational toy blocks. In particular, the system, in one embodiment, includes a plurality of polygonal-shaped building blocks each having a plurality of faces, wherein a first face features a first mathematical equation and a second face features a second mathematical equation. In addition, each building block features a distinct "fact family" illustrated through the operations of the first and second mathematical equations. In certain embodiments, the second mathematical equation comprises the inverse operation of the first mathematical equation. In one embodiment, the set includes ninety-one discrete building blocks each featuring a distinct "fact family" created by a unique pair of numbers from zero to twelve.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The toy block of the present invention enables young children to become familiar with basic numbers and mathematical principles while enjoying the simple nature of the building block. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIGS. 3-8 are side views illustrating multiple faces of one embodiment of an educational toy block in accordance with the present invention;

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to give a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
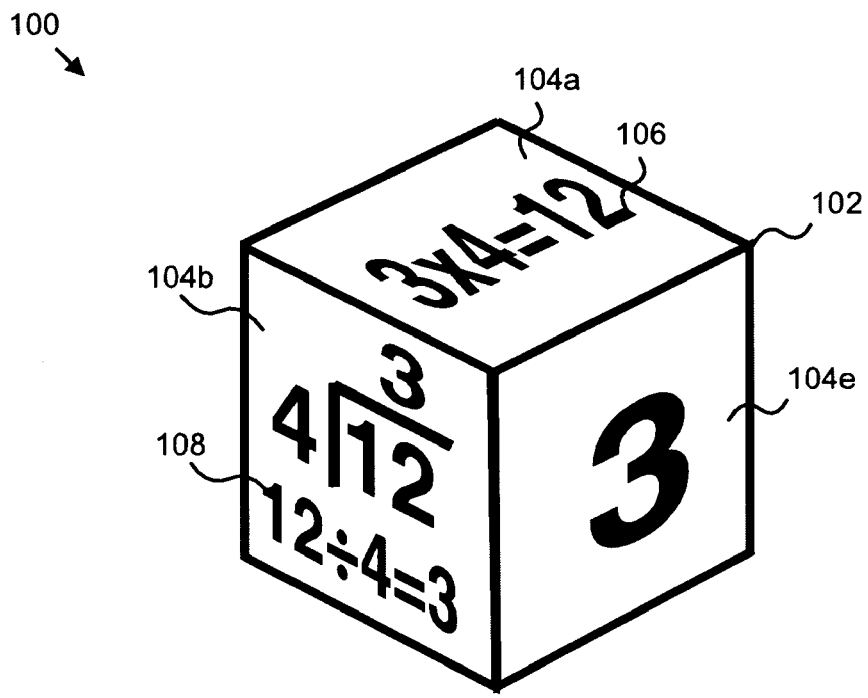
FIG. 1 is a perspective view illustrating one embodiment of an educational toy block in accordance with the present invention.
Figure 2:
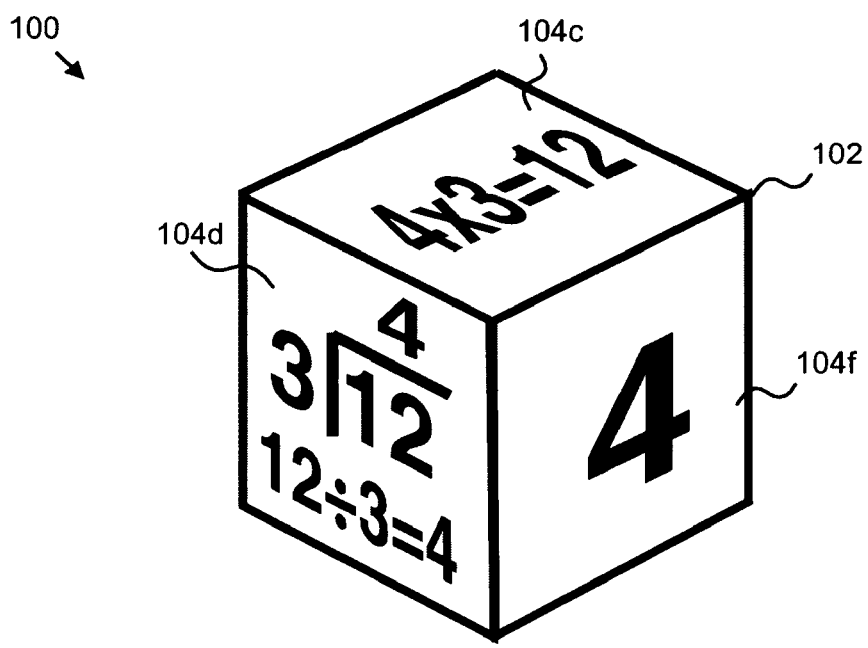
FIG. 2 is an alternative perspective view illustrating the educational toy block of FIG. 1.
Figure 9:
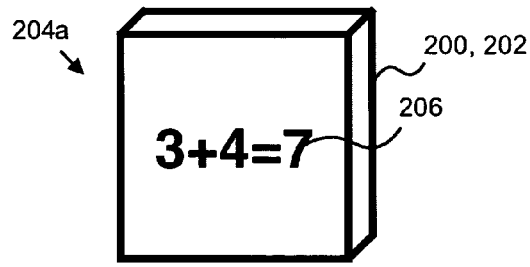
FIGS. 9-14 are side views illustrating multiples faces of an alternative embodiment of an educational toy block in accordance with the present invention.
Figure 10:
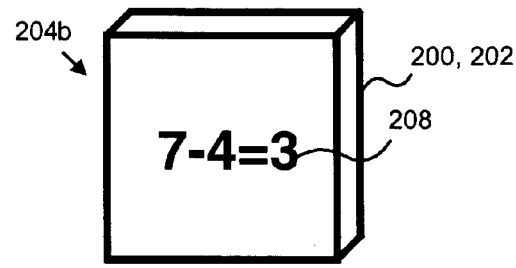
Figure 11:
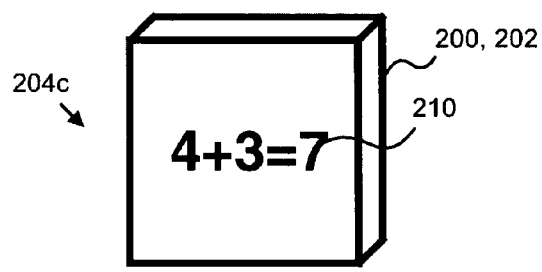
Figure 12:
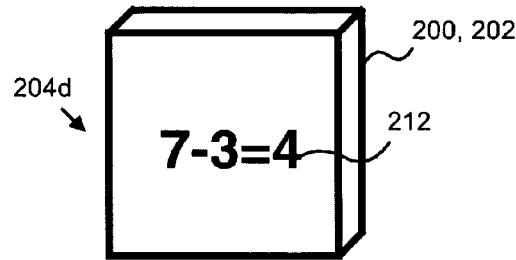
Figure 13:
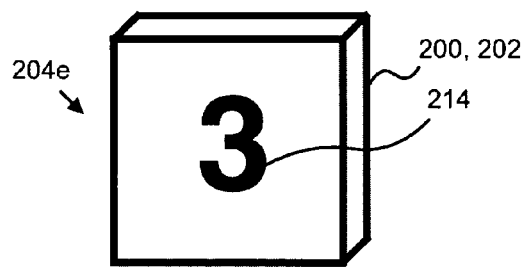
Figure 14:
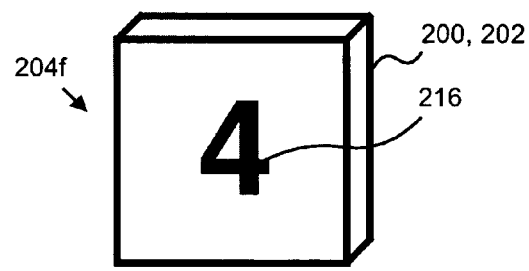

FIGS. 1-2 depict one embodiment of a toy block 100 in accordance with the present invention. As illustrated, the toy block 100 comprises a cube 102 having six congruent square faces 104$a$-$f$. In an alternative embodiment, the toy block 100 may comprise any polygonal-shaped building block having a plurality of faces 104. The toy block 100 may be sized, in certain embodiments, to enable small children to handle the block. In particular, the toy block 100 may enable small children to become familiar with mathematical concepts during play.

Each face 104 of the toy block 100 may or may not feature distinct mathematical or numerical elements. In certain embodiments, one or more faces 104 may be blank. In one embodiment, mathematical elements are repeated on different faces 104 of the toy block 100. For example, an octagonal-shaped building block may have two faces 104 that each features a number eight. The additional faces 104 of the block 100 may display mathematical equations or remain blank. Of course, mathematical equations as well as numbers may be repeated on multiple faces 104 of the toy block 100.

In a preferred embodiment, the toy block 100 includes at least a first face 104$a$ featuring a first mathematical equation 106 and a second face 104$b$ featuring a second mathematical equation 108. In the depicted embodiment, the cube 102 features a combination of distinct numbers and mathematical equations on each face 104$a$-$f$ of the toy block 100. The numbers and mathematical equations may illustrate number facts and may demonstrate a "fact family" in certain embodiments.

The toy block 100 may be made of a solid material such as wood, plastic, or the like as is known in the art. In a further embodiment, the toy block 100 may be hollow, meshed, or the like, so long as the featured mathematical and numerical elements on the faces 104 are viewable. In one embodiment, one or more faces 104 of the toy block 100 may be removable, interchangeable, rotatable and/or the like in order to add variety to the toy block 100. In addition, the surface of the toy block 100 may be clear, colored, textured, or the like. In a preferred embodiment, the toy block 100 is structurally designed to enable stacking of multiple toy blocks 100 as is known in the art.

The elements featured on the toy block 100 may be raised from the surface of the block 100, in certain embodiments, to distinguish the featured elements from the background and/or background surface of the toy block 100. Children may enjoy the tactile experience of feeling the raised elements. A predominantly touch-oriented embodiment with raised Braille numbering is illustrated in greater detail with respect to FIGS. 15-16.

Alternatively or in addition, the featured elements on the toy block 100 may be colored. In one embodiment, each number is colored differently to help children recognize the individual numbers and unique mathematical operands. In certain embodiments, the featured numbers and mathematical elements are large enough for small children to easily see and feel which may help small children develop muscle coordination, touch sensitivity, and visual recognition. Those of skill in the art will recognize that changes of appearance, composition, and structure of the toy block 100 are within the scope of the invention, and the present invention is not, therefore, limited to the illustrated embodiments.

FIGS. 3-8 illustrate in greater detail one embodiment of the faces 104a-f of the cube 102 depicted in FIGS. 1-2. The first face 104a in the depicted embodiment features a first mathematical equation 106 or a simple mathematical fact. The first mathematical equation 106 is a multiplication equation 106 including the numbers three, four, and twelve in the sequence: three multiplied by four equals twelve. The three featured numbers form a "fact family" that is illustrated through the mathematical equations and features on the other faces 104b-f of the cube 102.

The second face 104b of the illustrated cube 102 displays a second mathematical equation 108. The second mathematical equation 108, as depicted, is the inverse operation of the first mathematical equation 106, or the division equation of twelve divided by four equals three. The division equation 108, as well as other mathematical equations, may be shown in multiple forms on one or more faces 104 of the toy block 100. For example, the division equation 108 may be represented in long division form 108a and in sentence form 108b on a single face 104b, as depicted. In a further embodiment, the mathematical equations may be represented in Braille.

The third face 104c of the depicted cube 102 features a third mathematical equation 110 of the "fact family" featuring the same three numbers: four, three, and twelve. The third mathematical equation 110 in the depicted embodiment is an additional multiplication equation 110 or mathematical fact demonstrating the commutative property of multiplication by reversing the sequence of the elements of the first mathematical equation 106. Thus, the third equation 110, as depicted, features the sequence: four multiplied by three equals twelve.

The fourth face 104d of the depicted cube 102 features a fourth mathematical equation 112 illustrating the inverse operation of the third mathematical equation 110. The fourth mathematical equation 112 is a division equation: twelve divided by three equals four, featured in two forms 112a, 112b. The four equations 106, 108, 110, 112 featured on the four faces 104a-d of the cube 102 illustrate a unique numeric relationship for the numbers three, four, and twelve.

The fifth face 104e of the depicted cube 102 displays a first number 114 of the "fact family," which is featured in the four equations 106, 108, 110, 112. Similarly, the sixth face 104f of the cube 102 features a second number 116 of the "fact family," which is also featured in the four equations 106, 108, 110, 112. The numbers 114, 116 and the mathematical equations 106, 108, 110, 112 may be colored distinctly and raised to provide a tactile experience for the user. In addition, the grouping of equations 106, 108, 110, 112 and numbers 114, 116 of a "fact family" on a cube 102 may facilitate teaching children the relationship between numbers and mathematical operations in a play environment.

FIGS. 9-14 illustrate an alternative embodiment of a toy block 200 in accordance with the present invention. The toy block 200 features a "fact family" illustrated through the operations of addition and subtraction. Similar to the toy block 100, the toy block 200 comprises a cube 202 with six square faces 204a-f. In the depicted embodiment, each face 204 features a unique number or mathematical equation.

The first face 204a of the depicted cube 202 features a first mathematical equation 206, which is an addition equation: three plus four equals seven. The three numbers in the equation may form a "fact family" featured on the cube 102.

The second face 204b of the depicted cube 202 features a second mathematical equation 208 that comprises the inverse operation of the first mathematical equation 206, or in other words, a subtraction equation. The second mathematical equation 208 illustrates another mathematical fact: seven minus four equals three.

The contrast of the first mathematical equation 206 with the second mathematical equations 208 illustrates the value of the numbers featured in the "fact family" relative to each other. Exposing children to similar equations grouped on toy blocks 100, 200 may enable children to distinguish the ruling mathematical principles and to recognize mathematical operations at an early age. Alternatively, the toy blocks 100, 200 may enable children who are struggling to learn the concepts to review the principles illustrated on the blocks 100, 200.

The third face 204c of the depicted cube 202 features a third mathematical equation 210. The third mathematical equation 210 displays the elements of the first mathematical equation 206 in a reversed sequence: four plus three equals seven. The third mathematical equation 210 additionally demonstrates the commutative property of addition.

The fourth face 204d of the depicted cube 202 illustrates a fourth mathematical equation 212 that illustrates the inverse operation of the third mathematical equation 210: seven minus three equals four. The four equations 206, 208, 210, 212 together illustrate a distinct numeric relation that exists between the numbers three, four, and seven.

The fifth face 204e and the sixth face 204f of the illustrated cube 202 feature a first number 214 and a second number 216 respectively. The numbers three and four belong to the illustrated "fact family" and are featured in the equations 206, 208, 210, 212.

Figure 15:
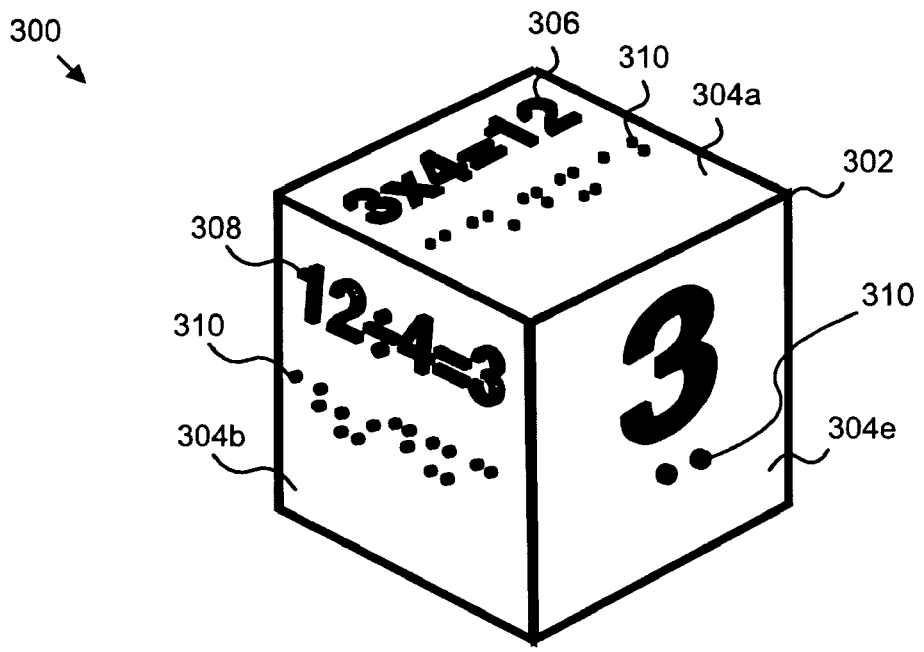
FIG. 15 is a perspective view illustrating one embodiment of an educational toy block with a Braille transliteration in accordance with the present invention.
Figure 16:
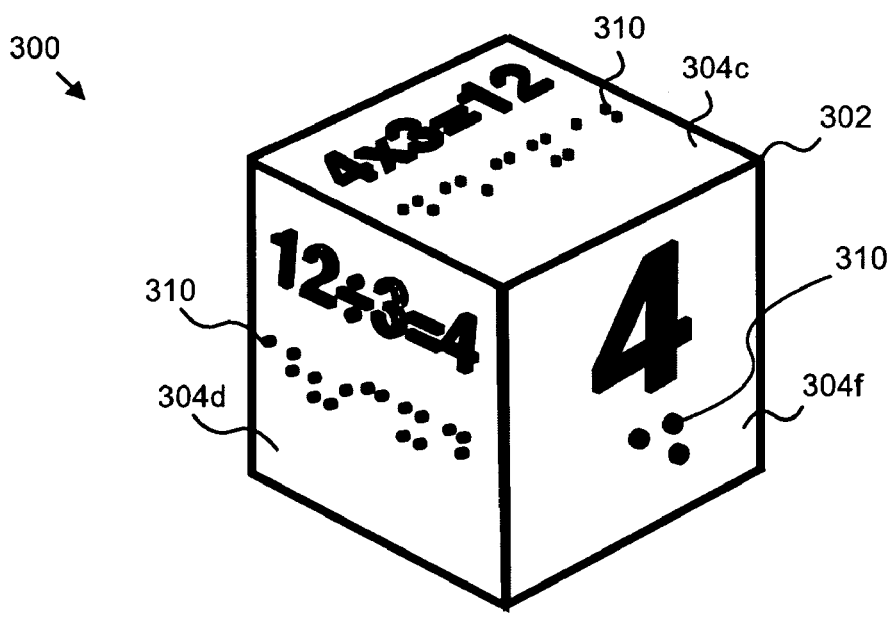
FIG. 16 is an alternative perspective view illustrating the educational toy block of FIG. 15.

FIGS. 15-16 illustrate an alternative embodiment of a toy block 300 in accordance with the present invention. The depicted toy block 300 comprises a cube 302 with six congruent square faces 304a-f. Each face 304a-f comprises a distinct number or mathematical equation relative to a "fact family."

The toy block 300, as illustrated, includes numeric and mathematical elements similar to those featured on the toy block 100 illustrated in FIGS. 1-8, including a first mathematical equation 306 and a second mathematical equation 308. The toy block 300, however, further comprises a Braille transliteration 310 of the elements featured on the cube 302. All of the featured numeric and mathematical elements, including the Braille transliterations 310, may be raised and distinctively colored to provide a tactile experience to the user. Consequently, users may be able to see and feel the contents presented on the toy block 300.

The toy block 300 additionally provides an educational toy designed to facilitate teaching the blind and visually impaired mathematical concepts including, but not limited to, "fact families" and inverse operations. The toy block 300 may facilitate teaching the commutative properties of addition and/or multiplication to young children as well as to older children who struggle with mathematical concepts or have learning disabilities.

In certain embodiments, the toy block 300 belongs to a set of toy blocks 300. In one embodiment, each toy block 300 within a set represents a distinct "fact family." In an alternative embodiment, each toy block 300 features one or more numbers in multiple equations. The toy blocks 300 may or may not be repeated within a set.

Figure 17:
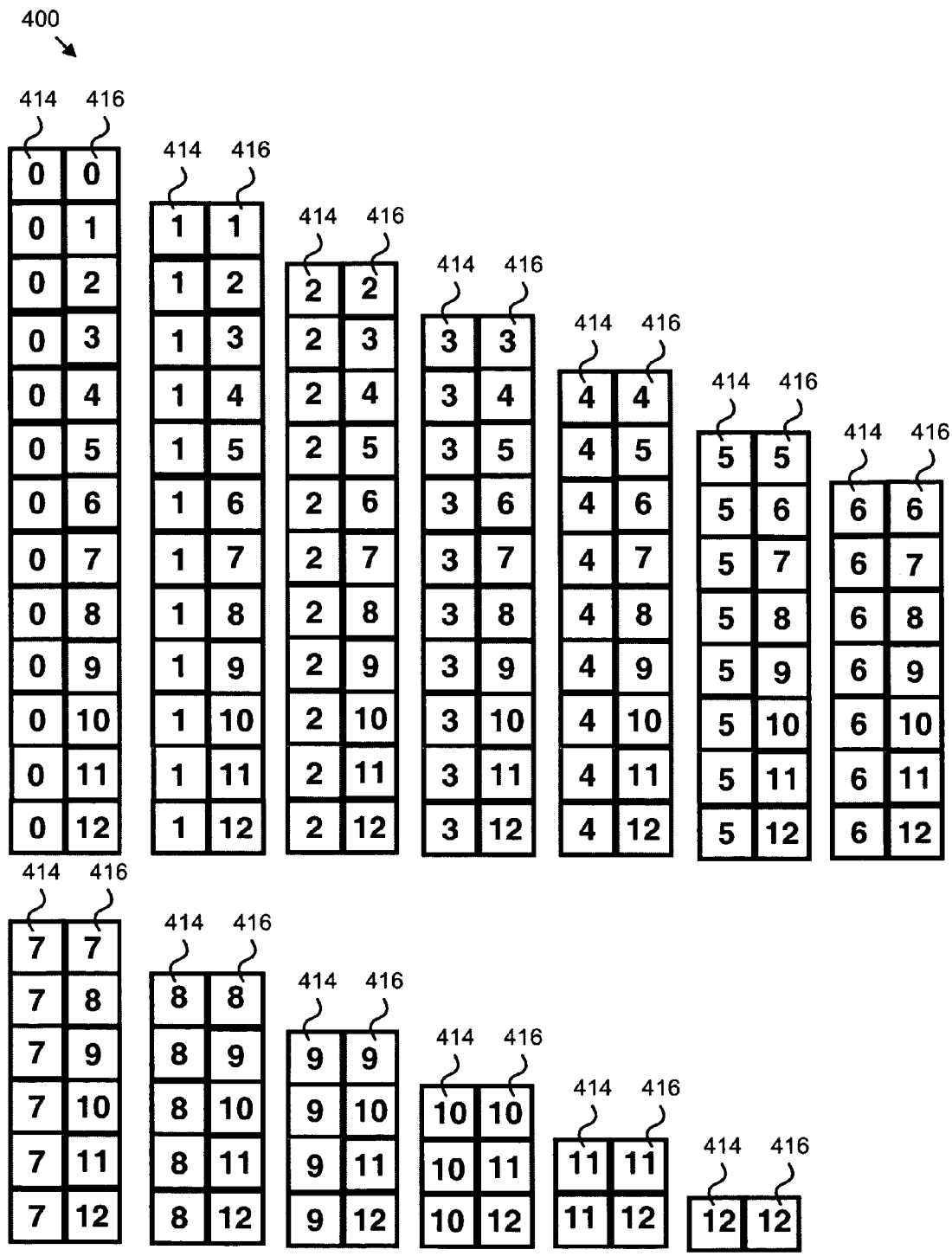
FIG. 17 is a graph illustrating unique number pairs of a set of educational toy blocks in accordance with the present invention.

FIG. 17 illustrates one embodiment of a set 400 that comprises ninety-one discrete building blocks 100 each featuring a distinct "fact family" created by a unique pair of numbers from zero to twelve. The first number 414 and the second number 416 of the unique pair are illustrated in the individual rows of the depicted columns.

In one embodiment, the first number 414 is featured on one of the plurality of faces 104 of the toy block 100, and a second number 416 is featured on another face 104 of the toy block 100. The first and second numbers 414, 416 are preferably elements of the first mathematical equation 106 and the second mathematical equation 108, as discussed above.

The operations of the first mathematical equation 106 and the second mathematical equation 108 may facilitate illustrating the distinct numeric relationship between the first number 414 and the second number 416 in certain embodiments. In one embodiment, the first mathematical equation 106 is a multiplication equation and the second mathematical equation 108 is a division equation. In an alternative embodiment, the first mathematical equation 106 is an addition equation and the second mathematical equation 108 is a subtraction equation.

In addition, the set 400 of building blocks 100 may help children recognize and memorize basic inverse operations and "fact families." In certain embodiments, the set 400 further encourages children to learn multiplication and division. In an alternative embodiment, the set 400 facilitates learning addition and subtraction.

In one embodiment, the set 400 of building blocks 100 comprises a combination of variously-shaped building blocks. For example, the set 400 may include rectangular blocks, cube-shaped blocks, pyramid-shaped blocks, and the like. In addition, the size of the blocks 100 may vary within a set 400.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of using an educational toy block to teach how mathematical operations are related, the method comprising:
   presenting a single fact family on a polygonal-shaped building block having a plurality of faces; and
   utilizing a single set of numbers on the polygonal-shaped building block;
   wherein a first face features a first mathematical equation;
   wherein a second face features a second mathematical equation; and
   wherein each of the mathematical equations utilizes the same set of numbers.

2. The toy block of claim 1, wherein the second mathematical equation comprises the inverse operation of the first mathematical equation.

3. The toy block of claim 2, wherein the first mathematical equation comprises a multiplication equation and the second mathematical equation comprises a division equation.

4. The toy block of claim 2, wherein the first mathematical equation comprises an addition equation and the second mathematical equation comprises a subtraction equation.

5. The toy block of claim 1, wherein a first number of the set of numbers is featured on one of the plurality of faces and a second number of the set of numbers is featured on another face of the building block.

6. The toy block of claim 5, wherein the first and second numbers are elements of the first mathematical equation.

7. The toy block of claim 1, wherein a third face of the building block features a third mathematical equation wherein the elements of the first mathematical equation are featured in a reversed sequence.

8. The toy block of claim 7, wherein a fourth face of the building block features a fourth mathematical equation, wherein the fourth mathematical equation comprises the inverse operation of the third mathematical equation.

9. The toy block of claim 1, wherein the building block further comprises a Braille transliteration of at least one of the first and second mathematical equations.

10. The toy block of claim 1, wherein the polygonal-shaped building block comprises a cube having six congruent square faces.

11. A set of educational toy blocks, the set comprising:
    a plurality of polygonal-shaped building blocks each having a plurality of faces, wherein a first face features a first mathematical equation and a second face features a second mathematical equation; and
    wherein each building block features a distinct "fact family" illustrated through the operations of the first and second mathematical equations;
    wherein each building block teaches respective facts on respective sides for a distinct "fact family"; and
    wherein the first and second mathematical equations and the respective facts teach how mathematical operations are related.

12. The set of claim 11, wherein the second mathematical equation comprises the inverse operation of the first mathematical equation.

13. The set of claim 12, wherein the first mathematical equation comprises a multiplication equation and the second mathematical equation comprises a division equation.

14. The set of claim 12, wherein the first mathematical equation comprises an addition equation and the second mathematical equation comprises a subtraction equation.

15. The set of claim 11, wherein the plurality of building blocks comprise ninety-one discrete building blocks each featuring a distinct "fact family" created by a unique pair of numbers from zero to twelve.

16. The set of claim 15, wherein a first number is featured on one of the plurality of faces and a second number is featured on another face of the building block.

17. The set of claim 11, wherein a third face of the building block features a third mathematical equation wherein the elements of the first mathematical equation are featured in a reversed sequence, and wherein a fourth face of the building block features a fourth mathematical equation wherein the fourth mathematical equation comprises the inverse operation of the third mathematical equation.

18. The set of claim 11, wherein at least one of the mathematical equations is featured in multiple forms on a face of the building block.

19. An educational toy block, the toy block comprising:
    a cube having six congruent square faces;
    a first face featuring a first mathematical equation;
    a second face featuring a second mathematical equation, the second mathematical equation comprising the inverse operation of the first mathematical equation;
    a third face featuring a third mathematical equation, the third mathematical equation comprising the elements of the first mathematical equation in a reversed sequence;
    a fourth face featuring a fourth mathematical equation, the fourth mathematical equation comprising the inverse operation of the third mathematical equation;
    a fifth face featuring a first number;
    a sixth face featuring a second number; and
    wherein the mathematical equations comprise the first and second numbers and illustrate a "fact family."

20. The toy block of claim 19, further comprising a Braille transliteration of at least one of the elements featured on the cube.

\* \* \* \* \*